US010060337B2

(12) United States Patent
Ohmori et al.

(10) Patent No.: US 10,060,337 B2
(45) Date of Patent: Aug. 28, 2018

(54) SUPERCHARGED ENGINE

(71) Applicant: HONDA MOTOR CO., LTD., Tokyo (JP)

(72) Inventors: Kenichi Ohmori, Wako (JP); Chikashi Takiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 651 days.

(21) Appl. No.: 14/665,436

(22) Filed: Mar. 23, 2015

(65) Prior Publication Data
US 2015/0275743 A1 Oct. 1, 2015

(30) Foreign Application Priority Data

Mar. 28, 2014 (JP) .................. 2014-067417

(51) Int. Cl.
*F02B 29/04* (2006.01)
*F02B 39/04* (2006.01)
*F02M 35/16* (2006.01)
*F02B 33/34* (2006.01)
*B62J 37/00* (2006.01)

(52) U.S. Cl.
CPC .......... *F02B 29/0443* (2013.01); *B62J 37/00* (2013.01); *F02B 33/34* (2013.01); *F02B 39/04* (2013.01); *F02M 35/162* (2013.01); *Y02T 10/146* (2013.01)

(58) Field of Classification Search
CPC ...... F02B 29/0443; F02B 33/34; F02B 39/04; B62J 37/00; F02M 35/162; Y02T 10/146
USPC ..................................... 123/559.1
See application file for complete search history.

(56) References Cited

U.S. PATENT DOCUMENTS

| 5,743,229 | A | * | 4/1998 | Hosoya | F01L 1/024 |
| | | | | | 123/195 A |
| 6,079,394 | A | | 6/2000 | Abthoff et al. | |
| 7,051,824 | B1 | * | 5/2006 | Jones | F02B 33/34 |
| | | | | | 123/559.1 |
| 7,469,689 | B1 | * | 12/2008 | Jones | F02B 33/40 |
| | | | | | 123/41.31 |
| 7,549,493 | B1 | * | 6/2009 | Jones | F02B 33/00 |
| | | | | | 123/559.1 |

(Continued)

FOREIGN PATENT DOCUMENTS

JP 2011-047288 A 3/2011

*Primary Examiner* — Jason Newton
(74) *Attorney, Agent, or Firm* — Birch, Stewart, Kolasch & Birch, LLP

(57) ABSTRACT

A supercharged engine having an electrically operated water pump for supplying cooling water to an intercooler in a compact layout. The supercharged engine includes a supercharger disposed rearwardly of a cylinder assembly of the engine, a drive pulley mounted on a supercharger drive shaft of the engine, a driven pulley mounted on an input shaft of the supercharger, a drive belt trained around the drive pulley and the driven pulley, an intercooler for cooling supercharging air that is supplied from the supercharger, and an electrically operated water pump for delivering cooling water under pressure to the intercooler. The supercharged engine also includes a belt tensioner for tensioning the drive belt. The electrically operated water pump is disposed on a crankcase which is positioned more closely to the center of the engine across the width thereof in directions along a crankshaft of the engine than the belt tensioner.

20 Claims, 11 Drawing Sheets

(56) References Cited

U.S. PATENT DOCUMENTS

| | | | | |
|---|---|---|---|---|
| 8,201,535 | B2* | 6/2012 | Oakes | F02B 27/02 |
| | | | | 123/184.21 |
| 9,399,974 | B2* | 7/2016 | Ito | B60K 13/02 |
| 9,683,486 | B2* | 6/2017 | Eisterlehner | F02B 67/06 |
| 2012/0192839 | A1* | 8/2012 | Arima | F02B 33/32 |
| | | | | 123/559.1 |
| 2013/0172137 | A1* | 7/2013 | Antchak | B60K 25/02 |
| | | | | 474/133 |
| 2014/0309882 | A1* | 10/2014 | Antchak | F02B 67/06 |
| | | | | 701/36 |
| 2015/0148160 | A1* | 5/2015 | Eisterlehner | F02B 67/06 |
| | | | | 474/87 |
| 2015/0275743 | A1* | 10/2015 | Ohmori | F02B 29/0443 |
| | | | | 123/563 |

* cited by examiner

SUPERCHARGED ENGINE

CROSS-REFERENCE TO RELATED APPLICATIONS

The present application claims priority under 35 USC 119 to Japanese Patent Application No. 2014-067417 filed Mar. 28, 2014 the entire contents of which are hereby incorporated by reference.

BACKGROUND OF THE INVENTION

1. Field of the Invention

The present invention relates to a supercharged engine wherein a coolant to be used to cool air supplied from a supercharger in an intercooler is delivered under pressure to the intercooler by an electrically operated coolant pump.

2. Description of Background Art

A supercharged engine is known wherein a supercharger is disposed between cylinder banks of a V-shaped engine with a drive pulley mounted on a crankshaft of the engine and a driven pulley coupled to the supercharger. A drive belt is trained around and extends between the drive pulley and the driven pulley. See, for example, U.S. Pat. No. 6,079,394.

If an intercooler for cooling air supplied from the supercharger of such a supercharged engine is supplied with cooling water by a mechanically driven water pump, since the rate of cooling water depends on only the rotational speed of the engine, the rate of the cooling water supplied by the water pump needs to be set to a required rate of cooling water no matter how the intercooler is operating. Consequently, the cooling water may occasionally be supplied at a rate in excess of the actually required rate.

In view of the above problems, there has been known an electrically operated water pump that is capable of supplying a required rate of cooling water depending on how the intercooler is cooling the supercharging air. See, for example, Japanese Patent Laid-Open No. 2011-47288.

However, inasmuch as the electrically operated water pump includes an electric motor, it occupies a large space and may not be installed in a compact layout on a supercharged engine.

SUMMARY AND OBJECTS OF THE INVENTION

It is an object of an embodiment of the present invention to provide a supercharged engine that allows an electrically operated water pump for supplying cooling water to an intercooler to be installed in a compact layout.

To achieve the above object, according to an embodiment of the present invention, there is provided a supercharged engine including a supercharger (31) that is disposed rearwardly of a cylinder assembly (61) of an engine (16), for supplying supercharging air into a combustion chamber of the engine (16), a drive pulley (53) mounted on a supercharger drive shaft (51) of the engine (16), a driven pulley (54) mounted on an input shaft (52) of the supercharger (31), a drive belt (56) trained around the drive pulley (53) and the driven pulley (54), a liquid-cooled intercooler (32) for cooling supercharging air that is supplied from the supercharger (31), and a coolant pump (33) for delivering a coolant under pressure to the intercooler (32). The supercharged engine includes a belt tensioner (57) for tensioning the drive belt (56). The coolant pump (33) is composed of an electrically operated coolant pump (33) actuatable by an electric motor (111) and disposed on a crankcase (27) that is positioned more closely to a center of the engine across a width thereof in directions along a crankshaft of the engine than the belt tensioner (57).

According to an embodiment of the present invention, the belt tensioner (57) may be disposed in a position overlapping the cylinder assembly (61) as viewed in the directions along the crankshaft, and the electrically operated coolant pump (33) may be disposed on an upper portion of the crankcase (27) and between the belt tensioner (57) and the cylinder assembly (61).

According to an embodiment of the present invention, the electrically operated coolant pump (33) may be provided such that a motor shaft (115) of the electric motor (111) extends perpendicularly to a crankshaft (91).

According to an embodiment of the present invention, coolant pump mount bosses (75d, 85a) having vertically extending bolt holes (33m) may be disposed on an upper surface of the crankcase (27) and a side surface of the cylinder assembly (61), and the electrically operated coolant pump (33) may be mounted by rubber mount structures on the coolant pump mount bosses (75d, 85a).

According to an embodiment of the present invention, a tensioner mount boss (75b) on which the belt tensioner (57) may be mounted projects sideways from the side surface of the cylinder assembly (61), and the coolant pump mount boss (75d) may be disposed on an upper portion of the tensioner mount boss (75b).

According to an embodiment of the present invention, a sub-radiator (34) that is connected to the electrically operated coolant pump (33) may be disposed forwardly of the cylinder assembly (61), and coolant pipes (95, 96, 97), that interconnect the intercooler (32) and the electrically operated coolant pump (33), the electrically operated coolant pump (33) and the sub-radiator (34), and the intercooler (32) and the sub-radiator (34), respectively, may be disposed in a space (130) that is defined sideways outwardly of the cylinder assembly (61) and sideways inwardly of the drive belt (56).

According to an embodiment of the present invention, coolant inlet ports (32b, 33a, 34a) disposed respectively on the intercooler (32), the electrically operated coolant pump (33), and the sub-radiator (34), and coolant outlet ports (32a, 33b, 34b) disposed respectively on the intercooler (32), the electrically operated coolant pump (33), and the sub-radiator (34) may extend along a plane perpendicular to the crankshaft (91).

According to an embodiment of the present invention, the supercharged engine includes the belt tensioner for tensioning the drive belt, and the coolant pump includes the electrically operated coolant pump actuatable by the electric motor and disposed on the crankcase that is positioned more closely to the center of the engine across the width thereof in directions along the crankshaft of the engine than the belt tensioner. The electrically operated coolant pump is capable of supplying a coolant at a necessary rate depending on the manner in which the intercooler cools intake air. Since the electrically operated coolant pump having the electric motor is disposed more closely to the center of the engine across the width thereof in directions along the crankshaft of the engine than the belt tensioner for tensioning the drive belt that actuates the supercharger, the electrically operated coolant pump is disposed in a compact layout on the engine.

The belt tensioner is disposed in a position overlapping the cylinder assembly as viewed in the directions along the crankshaft, and the electrically operated coolant pump is disposed on an upper portion of the crankcase and between the belt tensioner and the cylinder assembly. As the cylinder assembly of the engine is narrower than the crankcase, the electrically operated coolant pump is disposed in a compact layout in the space that is created sideways of the cylinder assembly due to the difference between the widths of the crankcase and the cylinder assembly.

Inasmuch as the electrically operated coolant pump is provided such that the motor shaft of the electric motor extends perpendicularly to the crankshaft, the electrically operated coolant pump is disposed in a compact layout in a small space defined between the belt tensioner and the cylinder assembly because the motor shaft extends perpendicularly to the crankshaft even if the motor shaft is relatively long.

The coolant pump mount bosses having the vertically extending bolt holes are disposed on the upper surface of the crankcase and the side surface of the cylinder assembly, and the electrically operated coolant pump is mounted by the rubber mount structures on the coolant pump mount bosses. The coolant pump mount bosses can easily be formed on the upper surface of the crankcase and the side surface of the cylinder assembly as the electrically operated coolant pump is placed on the upper portion of the crankcase and the side portion of the cylinder assembly.

The tensioner mount boss on which the belt tensioner is mounted projects sideways from the side surface of the cylinder assembly, and the coolant pump mount boss is disposed on the upper portion of the tensioner mount boss. Therefore, the belt tensioner can easily be mounted on the cylinder assembly, and the electrically operated coolant pump can be disposed in a compact layout including mount boss positions for accessories including the belt tensioner and the electrically operated coolant pump.

The sub-radiator that is connected to the electrically operated coolant pump is disposed forwardly of the cylinder assembly, and the coolant pipes that interconnect the intercooler and the electrically operated coolant pump, the electrically operated coolant pump and the sub-radiator, and the intercooler and the sub-radiator, respectively, are disposed in the space that is defined sideways outwardly of the cylinder assembly and sideways inwardly of the drive belt. Consequently, the electrically operated coolant pump and the coolant pipes are disposed in a compact layout on the engine.

The coolant inlet and outlet ports that are disposed respectively on the intercooler, the electrically operated coolant pump, and the sub-radiator extend along a plane perpendicular to the crankshaft. Therefore, the space occupied by the coolant pipes is reduced, allowing the space referred to above to be effectively utilized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
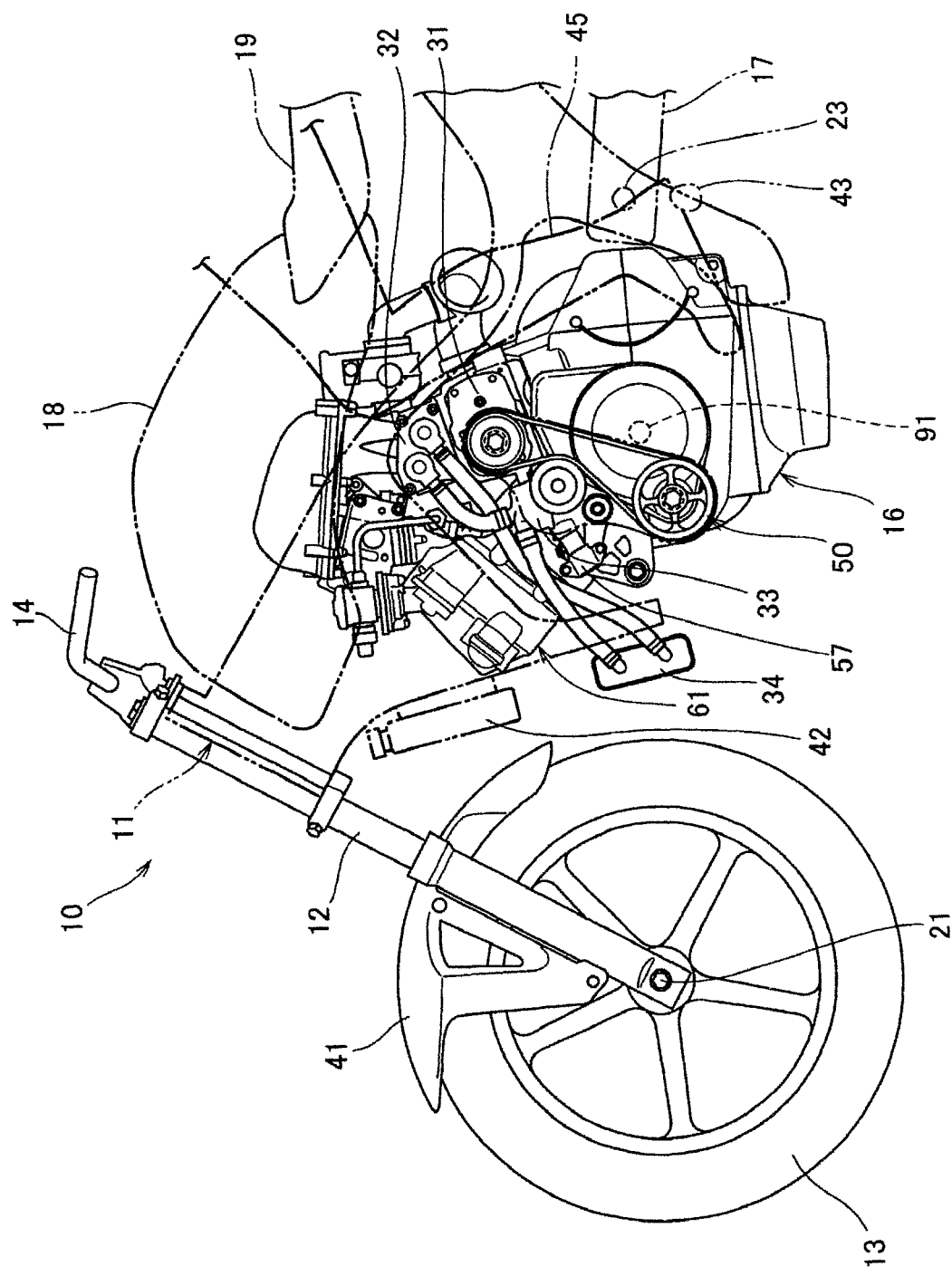
FIG. 1 is a left-hand side elevational view of a front portion of a motorcycle incorporating an engine according to an embodiment of the present invention.

An embodiment of the present invention will be described below with reference to the drawings. Directions such as front, rear, left, right, upper, and lower directions and similar directional terms referred to in the description are the same as those used with respect to a vehicle body unless otherwise specified. In the drawings, FR represents a front direction of the vehicle body, UP represents an upper direction of the vehicle body, and LH represents a left direction of the vehicle body.

FIG. 1 is a left-hand side elevational view of a front portion of a two-wheeled motorcycle 10 incorporating an engine 16 according to an embodiment of the present invention.

The motorcycle 10 includes a vehicle body frame 11, a front fork 12, a front wheel 13, a bar handle 14, an engine 16, a swing arm 17, a fuel tank 18, and a seat 19.

The front fork 12 is steerably supported on the front end of the vehicle body frame 11. The front wheel 13 is mounted on the lower end of the front fork 12 by an axle 21, and the bar handle 14 is mounted on the upper end of the front fork 12.

The engine 16 is supported on a front lower portion of the vehicle body frame 11, and the swing arm 17 is vertically swingably supported on a longitudinally central portion of the vehicle body frame 11 by a pivot shaft 23. A rear wheel (not shown) is supported on a rear end portion of the swing arm 17.

The fuel tank 18 is mounted on a front upper portion of the vehicle body frame 11, and the seat 19 is mounted on the vehicle body frame 11 behind the fuel tank 18.

The engine 16 includes a supercharger 31, an intercooler 32 for cooling supercharging air that is supplied from the supercharger 31, an electrically operated water pump 33 for supplying cooling water to the intercooler 32, and a sub-radiator 34 for cooling water supplied by the electrically operated water pump 33. A front fender 41 is provided for covering an upper portion of the front wheel 13. A radiator 42 is provided for cooling the engine 16. A rider's step 43 is provided with a rider's leg 45 placed on the step 43.

Figure 2:
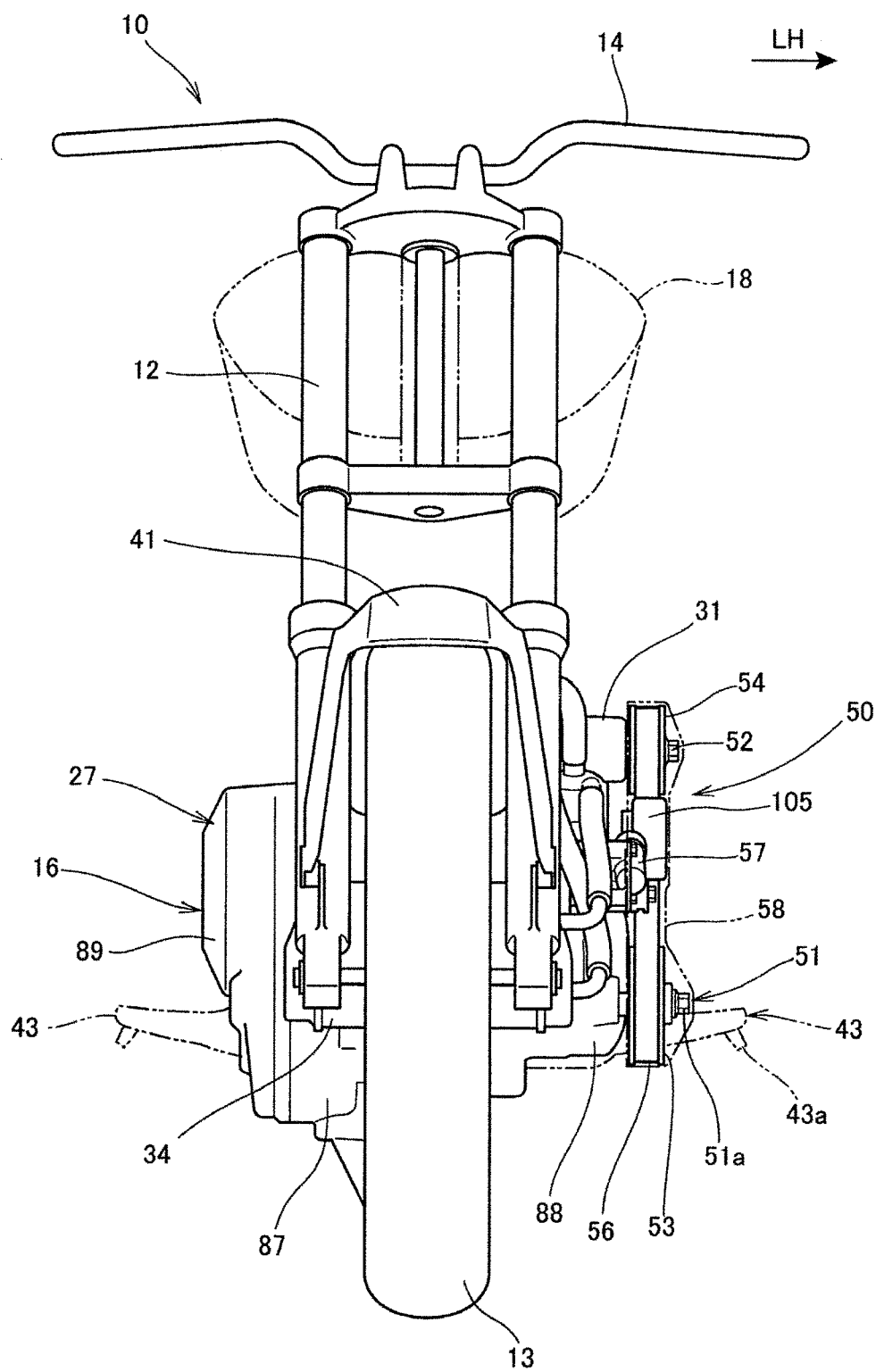
FIG. 2 is a front elevational view of the motorcycle.
Figure 3:
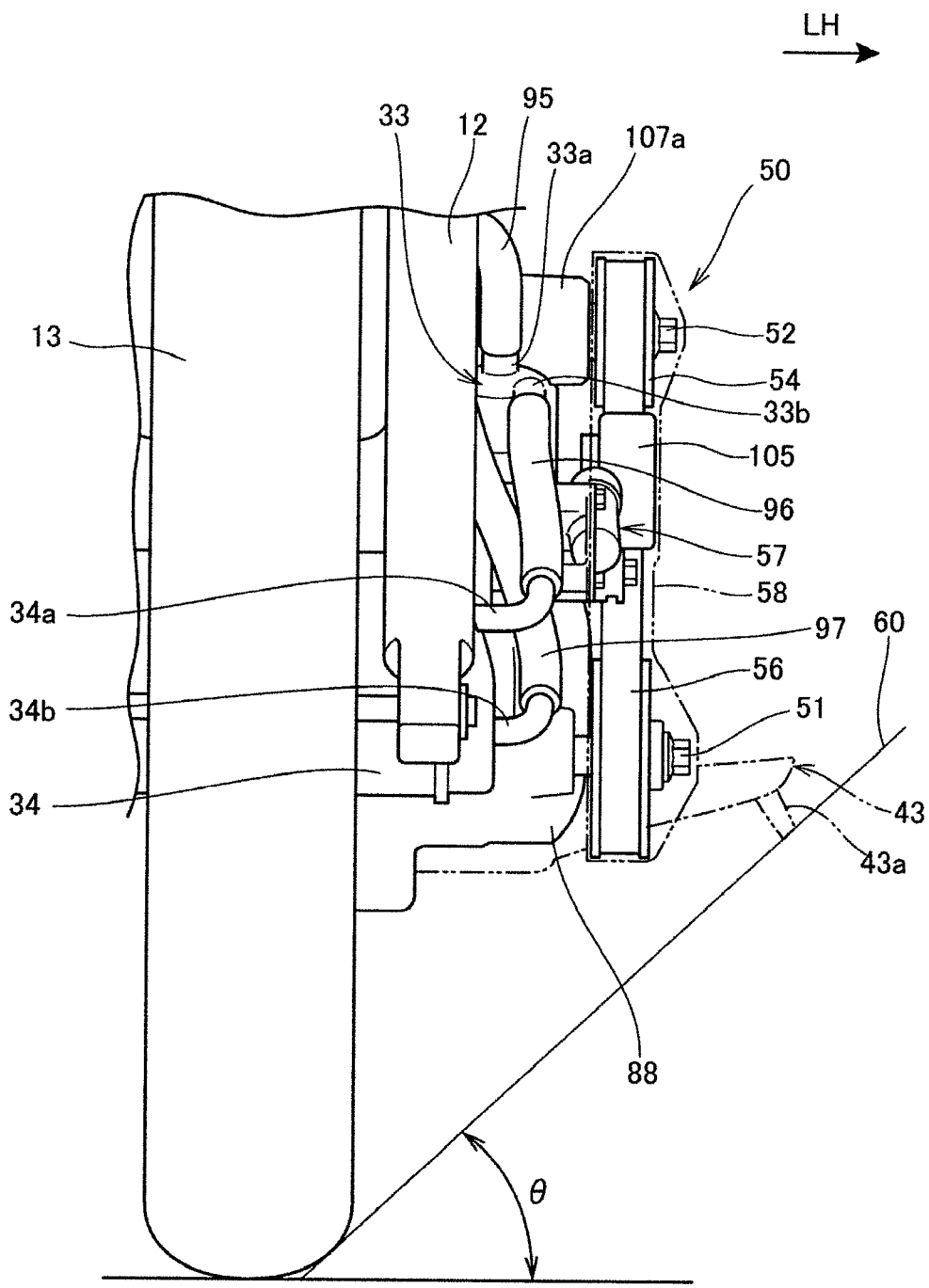
FIG. 3 is an enlarged fragmentary view of the motorcycle shown in FIG. 2.

FIG. 2 is a front elevational view of the motorcycle 10, and FIG. 3 is an enlarged fragmentary view of the motorcycle 10 shown in FIG. 2.

A supercharger drive shaft 51 that is actuatable by the crankshaft of the engine 16, or specifically an extension 51*a* of the supercharger drive shaft 51, and an input shaft 52 for rotating the rotor of the supercharger 31 project outwardly from the left side of the engine 16. A drive pulley 53 is mounted on the extension 51*a*, and a driven pulley 54 is mounted on the input shaft 52, with a drive belt 56 being trained around the drive pulley 53 and the driven pulley 54. The drive belt 56 is kept under tension by a belt tensioner 57 mounted on a crankcase 27 of the engine 16. The supercharger drive shaft 51 doubles as a balancer shaft of the engine 16.

The drive pulley 53, the driven pulley 54, the drive belt 56, and part of the belt tensioner 57 are covered sideways with a pulley cover 58. The drive pulley 53, the driven pulley 54, the drive belt 56, and the belt tensioner 57 make up a belt transmitting mechanism 50 for transmitting power from the supercharger drive shaft 51 to the supercharger 31. The pulley cover 58 is mounted on a side surface of the crankcase 27.

The sub-radiator 34 is disposed within the width of the crankcase 27 and has substantially the same width as the width of a main crankcase body 87 of the crankcase 27.

A straight line 60 which is illustrated as an imaginary line represents a ground surface that starts to contact a lower end 43*a* of the step 43 when the motorcycle 10 is tilted sideways at the time it travels around a corner or bend. θ denotes a bank angle. When the lower end 43*a* of the step 43 starts to contact the ground surface, since the rider recognizes that the vehicle body has tipped to the prescribed bank angle θ, the rider can prevent the vehicle body from tipping further.

The pulley cover 58 is positioned closer to the vehicle body than the straight line 60, and hence is disposed with a margin from the straight line 60 that is defined by the bank angle θ.

Figure 4:
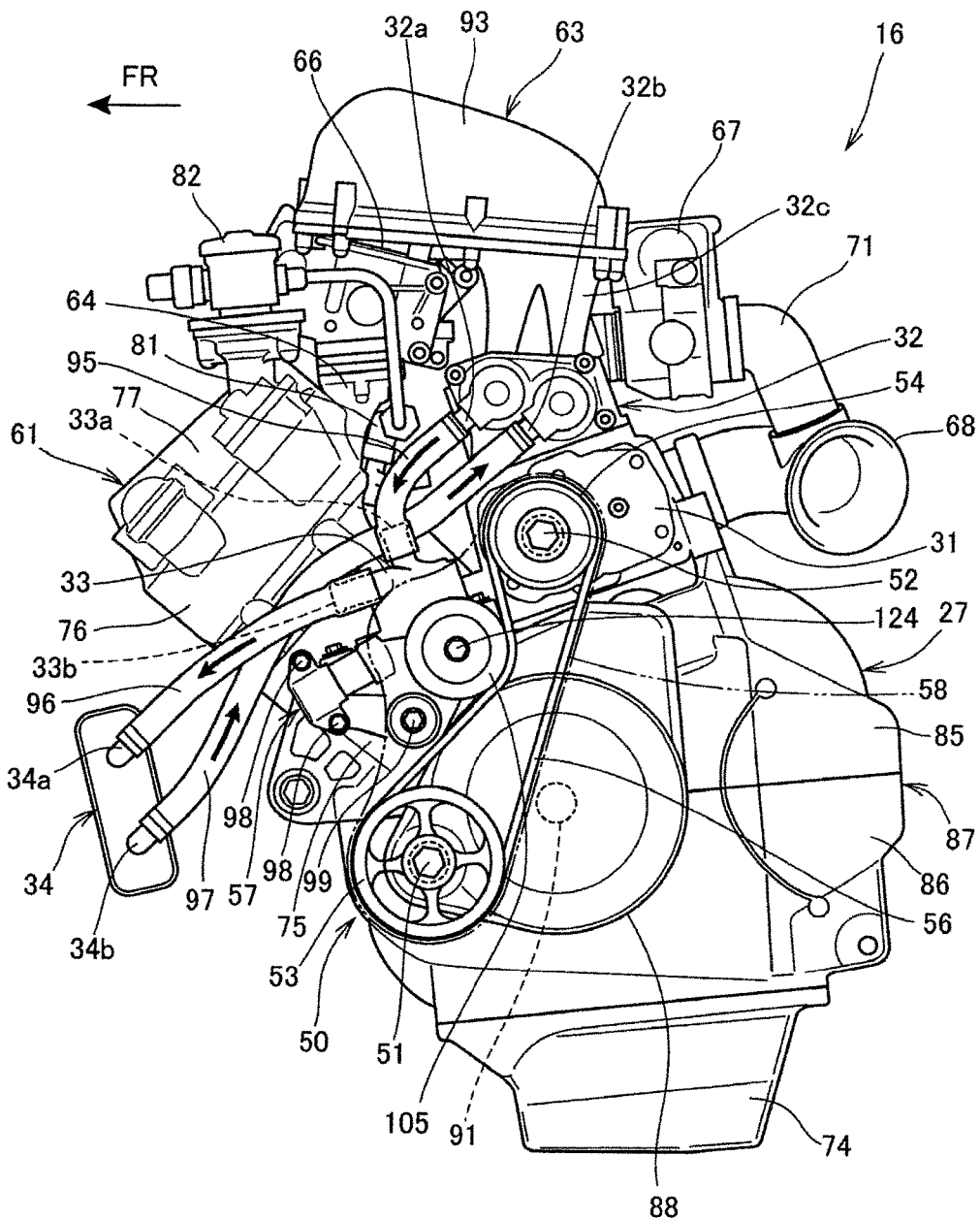
FIG. 4 is a left-hand side elevational view of the engine.

FIG. 4 is a left-hand side elevational view of the engine 16.

The engine 16 includes the crankcase 27, a cylinder assembly 61, the supercharger 31, the intercooler 32, a surge tank 63, a throttle body 66, a bypass device 67, a connecting tube 68, a bypass tube 71, an oil pan 74, the electrically operated water pump 33, and the belt transmitting mechanism 50.

The crankcase 27 has the main crankcase body 87 made up of an upper case 85 and a lower case 86 which are vertically separable from each other, and two crankcase covers 88 and 89 (only the crankcase cover 88 facing the viewer is shown) mounted respectively on the left and right side surfaces of the main crankcase body 87.

A crankshaft 91 is sandwiched and rotatably supported between the upper case 85 and the lower case 86. The supercharger drive shaft 51 that is rotatably supported by the lower case 86 is disposed obliquely forwardly and downwardly of the crankshaft 91.

The supercharger drive shaft 51 lies parallel to the crankshaft 91, and has an eccentric weight for reducing vibrations of the engine 16 when the supercharger drive shaft 51 rotates at the same rotational speed as the crankshaft 91. The supercharger drive shaft 51 is coaxial with the rotational shaft of a water pump (not shown) for circulating cooling water that cools the engine 16.

The cylinder assembly 61 includes a cylinder block 75 extending obliquely forwardly and upwardly from a front upper portion of the crankcase 27 (specifically, the upper case 85) and integrally combined with the front upper portion of the upper case 85, a cylinder head 76 mounted on an upper portion of the cylinder block 75, and a head cover 77 covering an upper opening of the cylinder head 76. A direct-injection fuel injection valve 81 for injecting a fuel into the combustion chamber in the engine 16 is mounted on a side surface of the cylinder head 76. A high-pressure pump 82 for supplying the fuel under a high pressure to the fuel injection valve 81 is mounted on an upper portion of the head cover 77.

The supercharger 31, which is mounted on a rear upper portion of the crankcase 27, houses therein two shafts and rotors mounted on the respective shafts. Power is transmitted from the input shaft 52 to one of the shafts of the supercharger 31, rotating the rotors that mesh with each other to compress air. Air that is supplied from an air cleaner through the connecting tube 68 to the supercharger 31 is compressed by the supercharger 31, and then delivered to the intercooler 32 where the air is cooled.

The intercooler 32 is mounted on an upper portion of the supercharger 31. The intercooler 32 has a cooler outlet port 32*a* and a cooler inlet port 32*b* on a left side thereof for taking cooling water out of and into a cooling water channel in the intercooler 32 therethrough, and also has a surge tank base 32*c* disposed integrally on an upper portion thereof. The intercooler 32 causes heat to be exchanged between supercharging air in an air channel therein and cooling water in the cooling water channel therein.

The surge tank 63 is a tank connected to the upper portion of the intercooler 32. The surge tank 63 includes the surge tank base 32*c* and a tank cover 93 closing an upper opening of the surge tank base 32*c*. The surge tank 63 provides a space for temporarily storing supercharging air therein.

The throttle body 66 has an upper end connected to a front lower portion of the surge tank base 32*c* and is connected to the cylinder head 76 by an intake pipe 64. The throttle body 66 has a throttle valve disposed therein which can be opened and closed to adjust the rate of supercharging air supplied to the combustion chamber.

The bypass device 67 is connected to a rear portion of the surge tank base 32*c*. When the pressure in the surge tank 63 increases to a prescribed value or higher, a valve housed in the bypass device 67 is opened to return supercharging air in the surge tank 63 through the bypass tube 71 into the connecting tube 68.

The connecting tube 68 interconnects the air cleaner (not shown) and the supercharger 31.

The oil pan 74 is mounted on a lower portion of the lower case 86.

The electrically operated water pump 33 is a pump for supplying cooling water to the intercooler 32. The electrically operated water pump 33 is mounted on an upper portion of the upper case 85 of the crankcase 27 and a side portion of the cylinder block 75 of the cylinder assembly 61. The electrically operated water pump 33 has a pump inlet port 33*a* on an upper central portion thereof for drawing in cooling water and a pump outlet port 33*b* on an upper front portion for discharging cooling water.

The pump inlet port 33*a* is connected to the cooler outlet port 32*a* of the intercooler 32 by a first cooling water hose 95. The pump outlet port 33*b* is connected to a radiator inlet port 34*a* of the sub-radiator 34 by a second cooling water hose 96. The cooler inlet port 32*b* of the intercooler 32 is connected to a radiator outlet port 34*b* of the sub-radiator 34 by a third cooling water hose 97.

Cooling water having a pressure that has been increased by an impeller (not shown) in the electrically operated water pump 33 is delivered from the pump outlet port 33*b* through the second cooling water hose 96 and then from the radiator inlet port 34*b* into the sub-radiator 34. The cooling water has its temperature lowered by having its heat radiated by the sub-radiator 34, and is delivered from the radiator outlet port 34b through the third cooling water hose 97 and then from the cooler inlet port 32b of the intercooler 32 into the intercooler 32. The cooling water has its temperature increased by exchanging heat with supercharging air in the intercooler 32, and is delivered from the cooler outlet port 32a through the first cooling water hose 95 and then from the pump inlet port 33a into the electrically operated water pump 33. Subsequently, the cooling water will be circulated in the manner described above. The arrows in FIG. 4 indicate the flow of the cooling water.

The driven pulley 54 of the belt transmitting mechanism 50 is smaller in diameter than the drive pulley 53 thereof. Therefore, the input shaft 52 of the supercharger 31 rotates at a speed higher than the supercharger drive shaft 51.

The belt tensioner 57 is mounted on a side of the cylinder block 75 by a plurality of bolts 98 and 99. The belt tensioner 57 has a tension roller 105 on its end which is pressed against a rear portion of the drive belt 56, keeping the drive belt 56 under a prescribed tension.

The pulley cover 58 covers the belt transmitting mechanism 50 sideways, except part of the belt tensioner 57.

As described above, since the belt transmitting mechanism 50 is disposed forwardly of the crankshaft 91, a distance is easily kept between the belt transmitting mechanism 50 and the rider's leg 45, as shown in FIG. 1.

Figure 5:
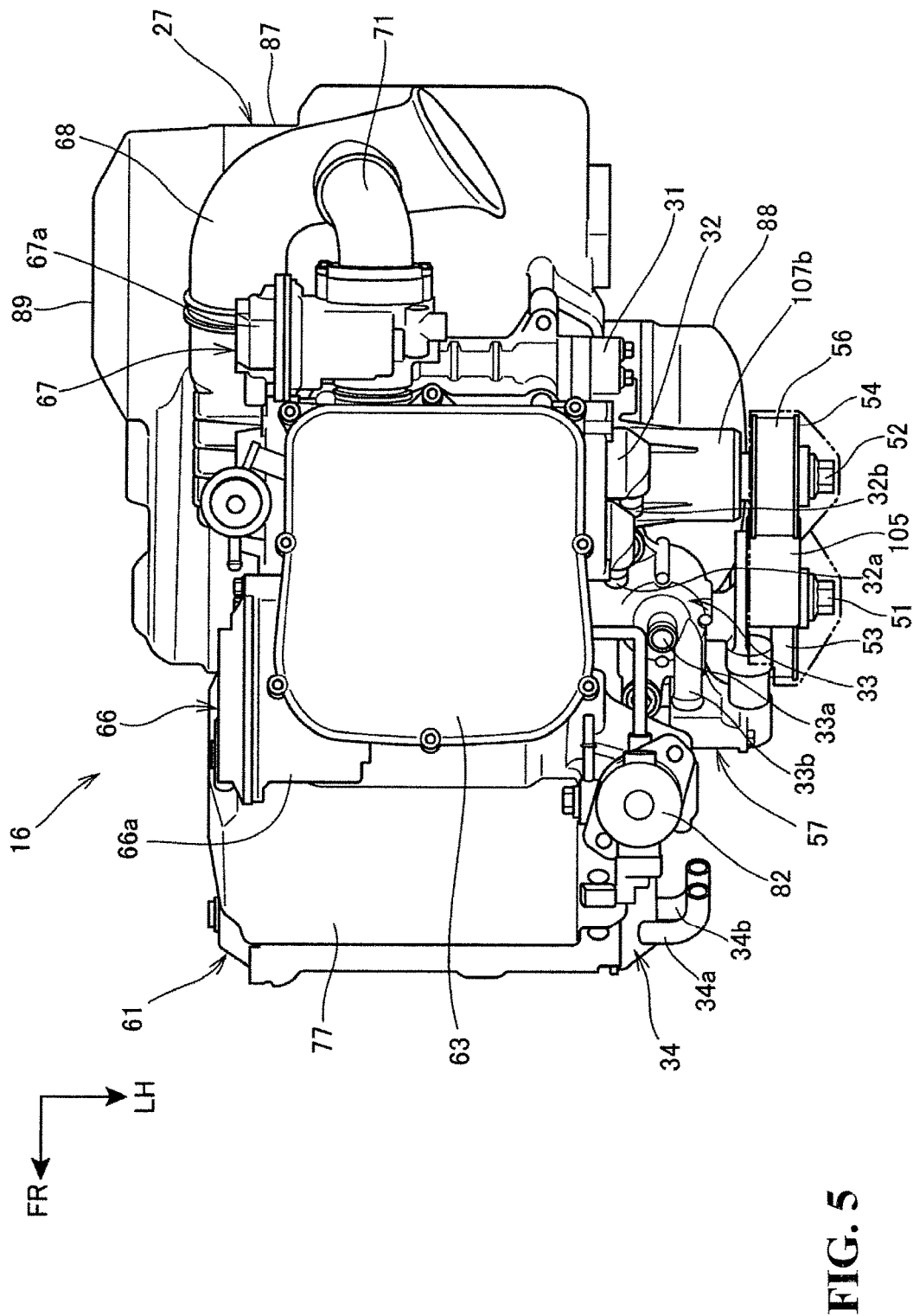
FIG. 5 is a plan view of the engine.

FIG. 5 is a plan view of the engine 16.

In the crankcase 27, the main crankcase body 87 is disposed centrally in the transverse directions of the vehicle body, the crankcase cover 88 is disposed leftwardly in the transverse directions of the vehicle body of the main crankcase body 87, and the crankcase cover 89 is disposed rightwardly in the transverse directions of the vehicle body.

The cylinder assembly 61 is disposed on a front upper portion of the main crankcase body 87. The electrically operated water pump 33 and the belt tensioner 57 are disposed above the left crankcase cover 88. The high-pressure pump 82 is disposed on an upper end of the cylinder assembly 61.

The rotating members of the belt transmitting mechanism 50, such as the drive pulley 53, the driven pulley 54, the tension roller 105, and the drive belt 56, are disposed outwardly of the left crankcase cover 88 in the transverse directions of the vehicle body.

The surge tank 63 is positioned substantially centrally in the engine 16 as viewed in plan. Beneath a right side of the intercooler 32 that projects to the left from the surge tank 63 in the transverse directions of the vehicle body, there extends the connecting tube 68 rearwardly from a right side of the supercharger 31, curved to the left in the transverse directions of the vehicle body and connected to the air cleaner (not shown). The bypass device 67 is disposed rearwardly and rightwardly of the intercooler 32. The bypass device 67 has an electronically controlled valve mechanism whose valve is opened and closed by an actuator 67a disposed on a right end of the bypass device 67. The bypass tube 71 extends from a rear portion of the bypass device 67 to the connecting tube 68 somewhere in an intermediate region thereof.

The throttle body 66 is disposed on the surge tank 63 in the vicinity of a front right corner thereof. The throttle body 66 has an electronically controlled throttle mechanism whose throttle valve is opened and closed by a throttle actuator 66a disposed on a front right portion of the surge tank 63. A throttle grip on the bar handle 14 (see FIG. 1), a controller, and the throttle actuator 66a are connected to each other by leads, providing a throttle-by-wire (TBW) structure.

Figure 6:
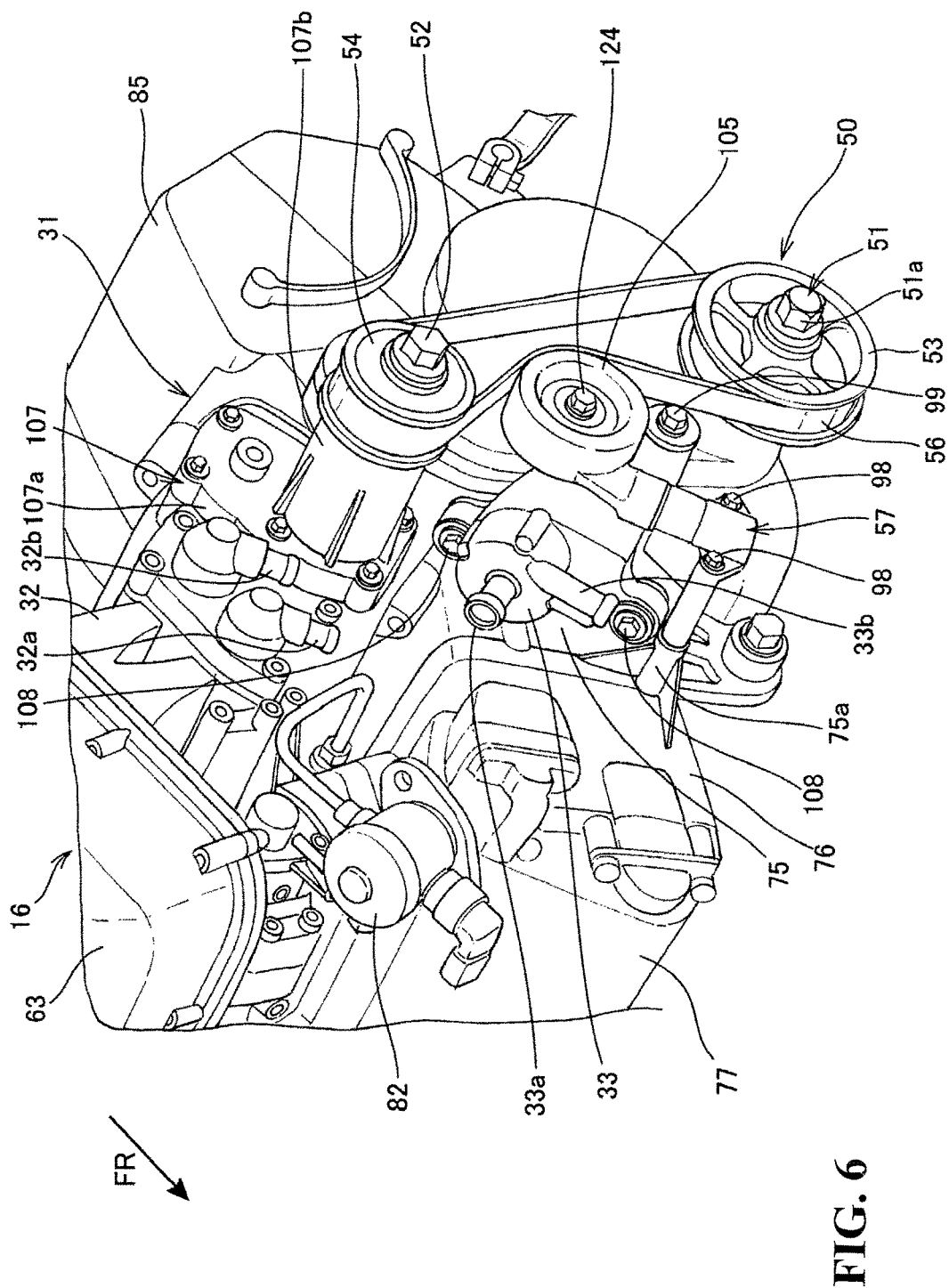
FIG. 6 is a fragmentary perspective view of the engine.

FIG. 6 is a fragmentary perspective view of the engine 16.

The supercharger 31 has a casing including a left case 107 that is composed of a flange 107a and a tubular member 107b integrally combined with and extending leftwardly from the flange 107a. The input shaft 52 is rotatably supported in the tubular member 107b by a bearing.

The electrically operated water pump 33 is disposed obliquely forwardly and downwardly of the tubular member 107b and has front and rear portions fastened respectively to the cylinder block 75 and the upper case 85 by bolts 108. The pump inlet port 33a of the electrically operated water pump 33 extends obliquely upwardly and forwardly, whereas the pump outlet port 33b thereof extends obliquely downwardly and forwardly.

The belt tensioner 57 is fastened to a plurality of lateral bosses 75a, 75b, and 75c (only the lateral boss 75a facing the viewer is shown) integrally combined with and projecting from the side of the cylinder block 75 by the respective bolts 98 and 99 that are tightened from outside in the transverse directions of the vehicle body.

Figure 7:
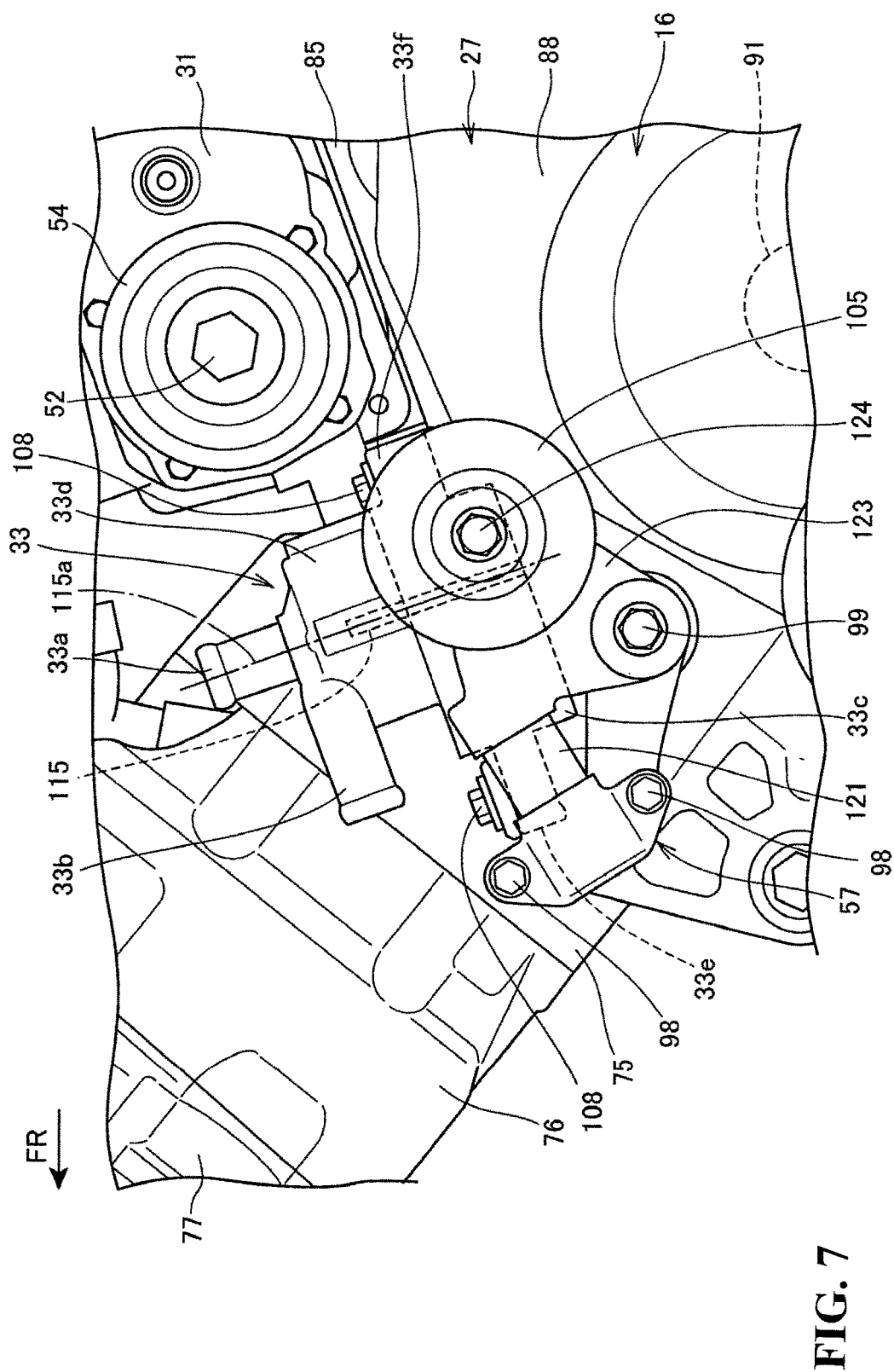
FIG. 7 is a fragmentary left-hand side elevational view of an electrically operated water pump and parts in the periphery thereof.

FIG. 7 is a fragmentary left-hand side elevational view of the electrically operated water pump 33 and parts in the periphery thereof.

The electrically operated water pump 33 includes a pump base 33c housing an electric motor therein, a tubular member 33d extending upwardly from the pump base 33c and housing an impeller therein, the tubular member 33d having the pump inlet port 33a and the pump outlet port 33b, and mounts 33e and 33f extending forwardly and rearwardly respectively from the pump base 33c and mounted on the cylinder block 75 and the upper case 85, respectively.

The electric motor has a motor shaft 115 extending obliquely upwardly and forwardly through the center of a cross section of the tubular member 33d and inclined 90 degrees to the crankshaft 91 that extends perpendicularly to the sheet of FIG. 7.

In FIG. 7, an axis 115a of the motor shaft 115 is provided with the pump inlet port 33a being disposed on the axis 115a. The pump outlet port 33b is inclined 90 degrees to the motor shaft 115.

The belt tensioner 57 includes a biasing device 121 for generating a biasing force, a swing arm 123 disposed on the biasing device 121 and swingably supported on the bolt 99 that serves as a pivot shaft, and the tension roller 105 that is rotatably mounted on an end of the swing arm 123 by a pivot shaft 124. The tension roller 105 is pressed against the drive belt 56 (see FIG. 6) a prescribed pressing force by the swing arm 123 due to the biasing force of the biasing device 121.

Figure 8:
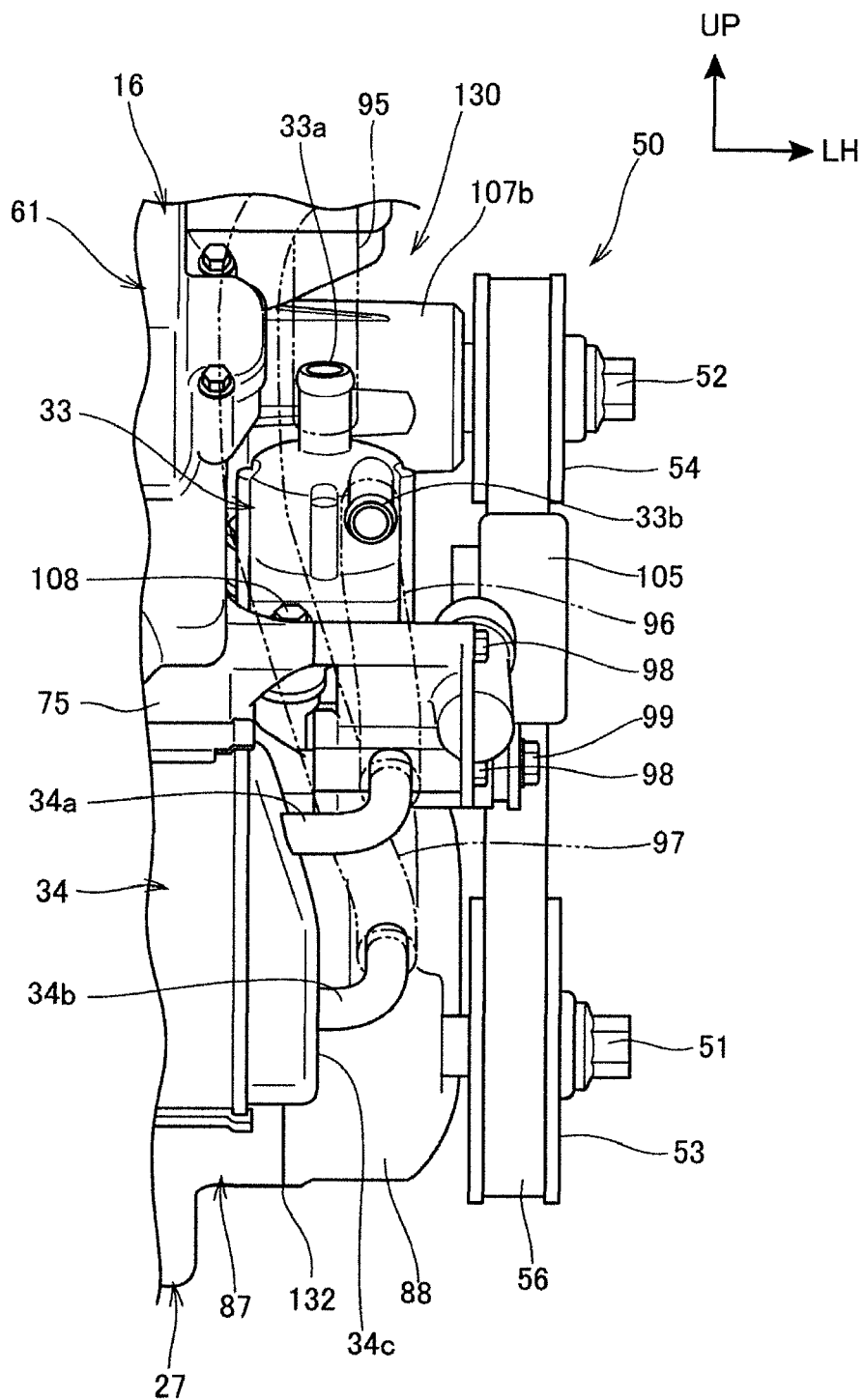
FIG. 8 is a fragmentary front elevational view of the electrically operated water pump and the parts in the periphery thereof.

FIG. 8 is a fragmentary front elevational view of the electrically operated water pump 33 and the parts in the periphery thereof.

The electrically operated water pump 33 is disposed in a space 130 that is present sideways outwardly of the cylinder assembly 61 in the transverse directions of the vehicle body and sideways inwardly of the drive belt 56 in the transverse directions of the vehicle body. More specifically, the electrically operated water pump 33 is disposed in the space 130 above the left crankcase cover 88 and sideways leftwardly of the cylinder assembly 61, or specifically the cylinder block 75 thereof.

The electrically operated water pump 33 is disposed inwardly of the tension roller 105 of the belt transmitting mechanism 50 in the transverse directions of the vehicle body. Therefore, the space 130, which has heretofore been a dead space in the engine 16, is effectively utilized to place the electrically operated water pump 33 in a compact fashion therein.

The sub-radiator 34 includes a left side surface 34c that is substantially aligned with a mating surface 132 between the main crankcase body 87 and the crankcase cover 88. The radiator inlet port 34a and the radiator outlet port 34b of the sub-radiator 34 are disposed forwardly of the left crankcase cover 88. As a result, the first cooling water hose 95 and the second cooling water hose 96 that are connected to the electrically operated water pump 33, and the third cooling water hose 97 that interconnects the intercooler 32 (see FIG. 6) and the sub-radiator 34 are allowed to extend in the space 130.

As shown in FIGS. 4, 5, and 8, the cooler outlet port 32a and the cooler inlet port 32b of the intercooler 32 are directed obliquely forwardly and downwardly, the pump inlet port 33a of the electrically operated water pump 33 is directed obliquely upwardly and forwardly. The pump outlet port 33b thereof is directed obliquely forwardly and downwardly. In addition, the radiator inlet port 34a and the radiator outlet port 34b of the sub-radiator 34 are directed obliquely rearwardly and upwardly. In other words, the inlet ports 32b, 33a, and 34a and the outlet ports 32a, 33b, and 34b are disposed along a plane extending in the longitudinal directions of the vehicle body and the vertical directions, i.e., a plane perpendicular to the crankshaft 91.

Since the cooling water hoses 95, 96, and 97 thus extend substantially in the longitudinal directions of the vehicle body and are minimally bent in the transverse directions of the vehicle body, any space that is taken up by the cooling water hoses 95, 96, and 97 in the space 130 is minimized.

Consequently, the hoses that are used to cool the intercooler 32, i.e., the first cooling water hose 95, the second cooling water hose 96, and the third cooling water hose 97, and the electrically operated water pump 33 are placed in a compact layout in the space 130.

Figure 9:
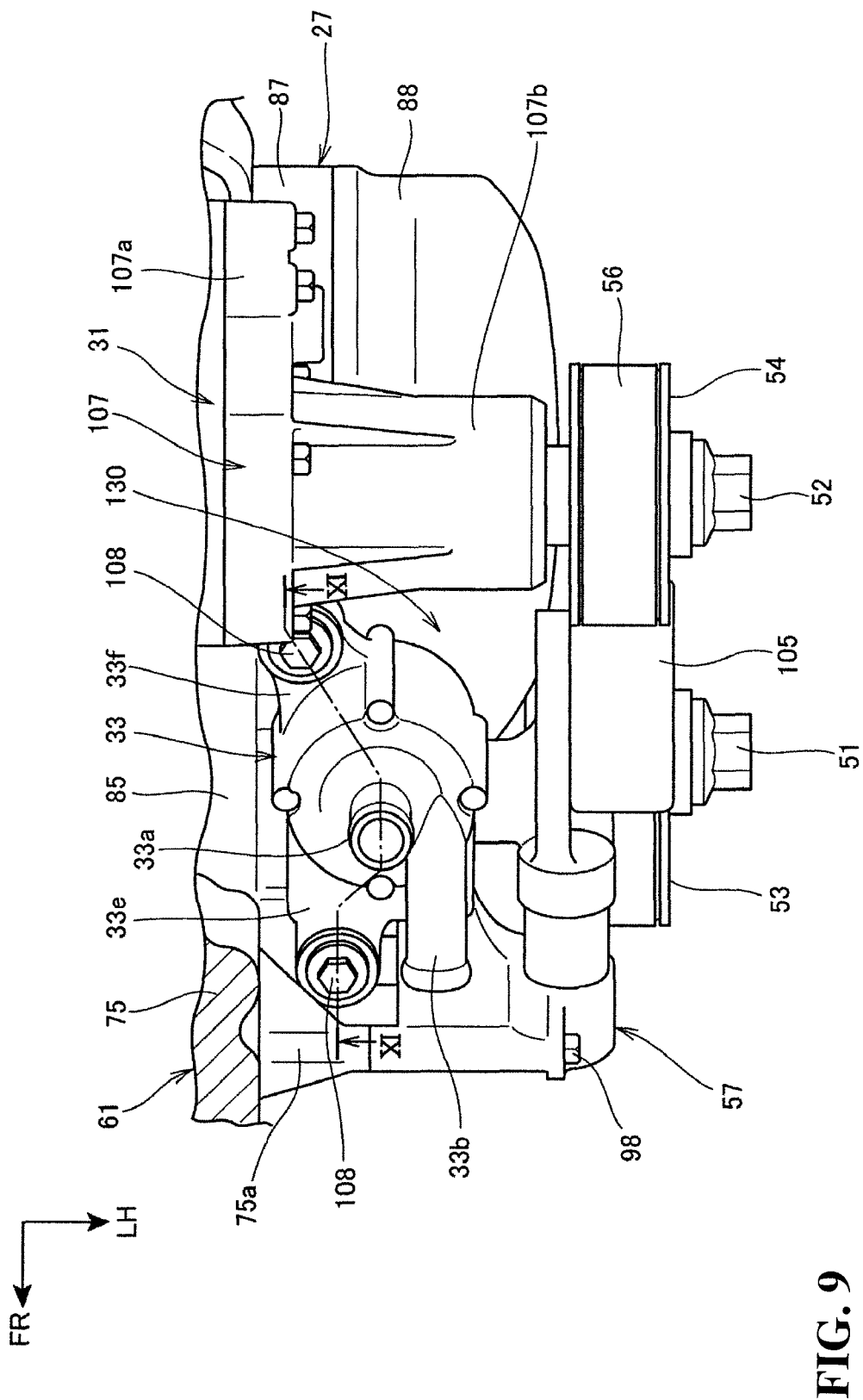
FIG. 9 is a fragmentary plan view of the electrically operated water pump and the parts in the periphery thereof.
Figure 10:
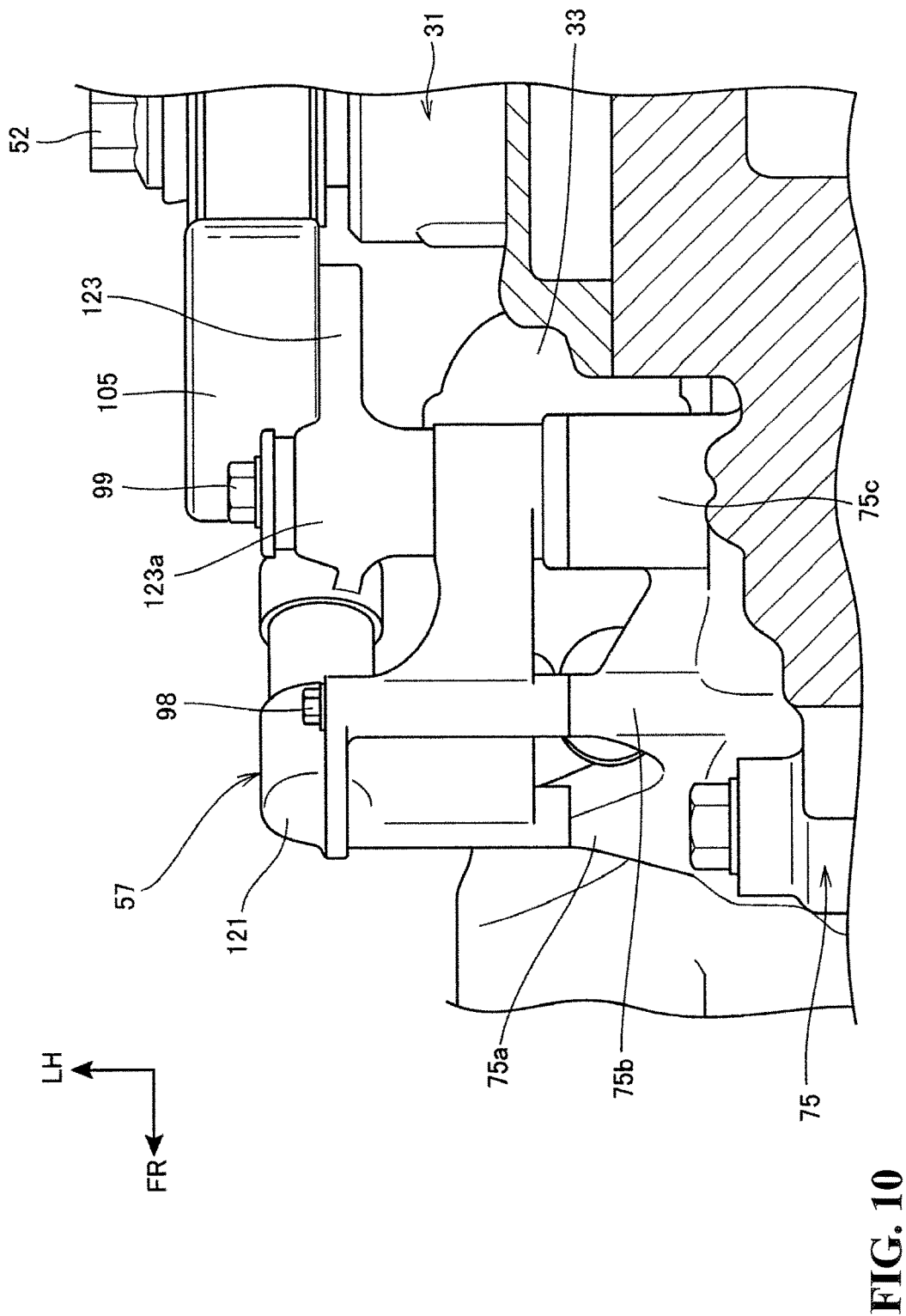
FIG. 10 is a fragmentary bottom view of a belt tensioner and parts in the periphery thereof.

FIG. 9 is a fragmentary plan view of the electrically operated water pump 33 and the parts in the periphery thereof. FIG. 10 is a fragmentary bottom view of the belt tensioner 57 and parts in the periphery thereof.

As shown in FIG. 9, the electrically operated water pump 33 has the front mount 33e fastened to the cylinder block 75 by the bolt 108 and the rear mount 33f fastened to the upper case 85 by the bolt 108.

The electrically operated water pump 33 is positioned behind the lateral boss 75a projecting from the cylinder block 75 and a portion of the belt tensioner 57, and disposed forwardly of the tubular member 107b of the supercharger 31. Thus, the electrically operated water pump 33 is covered with the components positioned forwardly and rearwardly thereof, and hence protected from flying pebbles or the like.

As shown in FIG. 10, the belt tensioner 57 is fastened to the two lateral bosses 75a and 75b of the cylinder block 75 by the bolts 98 (only one bolt 98 is shown), and supported on the other lateral boss 75c by the bolt 99. The swing arm 123 of the belt tensioner 57 has a tubular member 123a through which the bolt 99 extends, so that the tubular member 123a is angularly movably supported on the bolt 99. In other words, the bolt 99 doubles as a swing shaft for the swing arm 123 of the belt tensioner 57.

Figure 11:
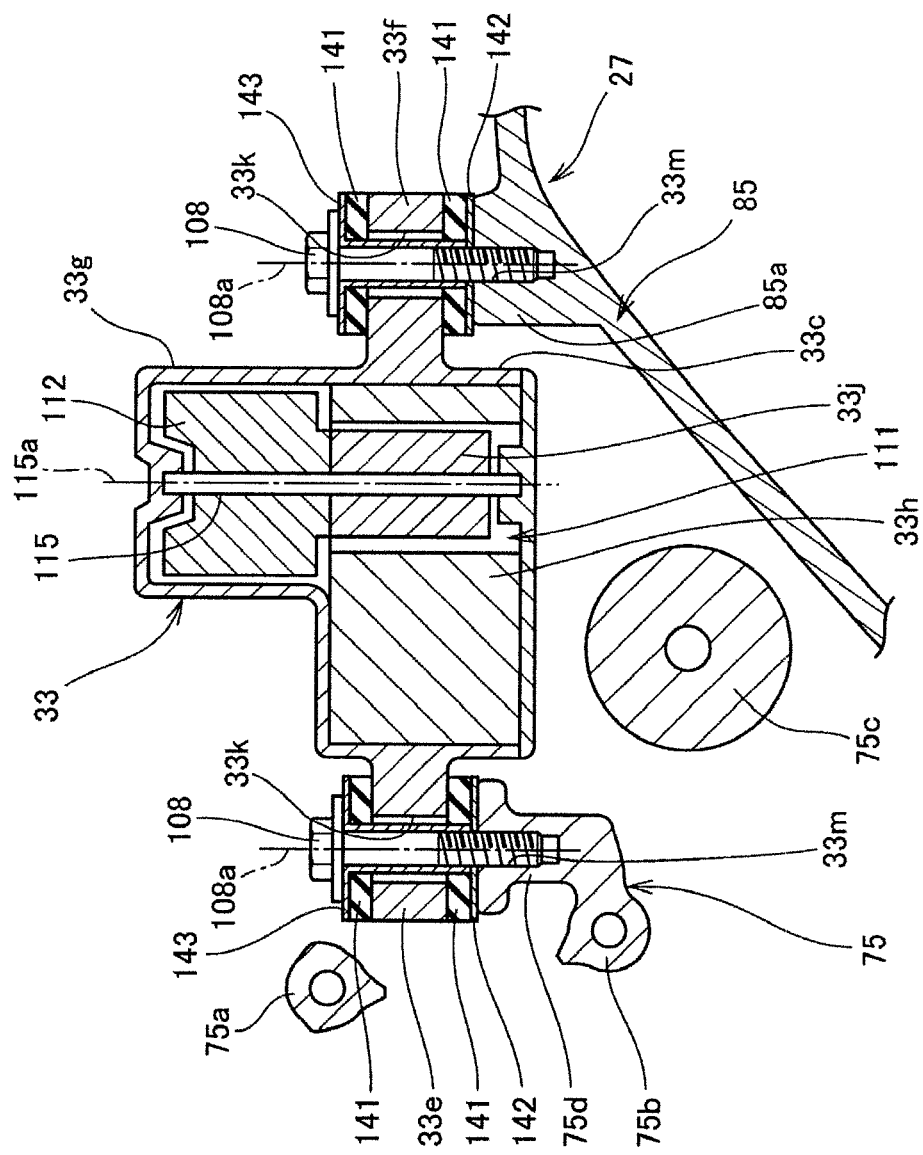
FIG. 11 is a cross-sectional view taken along line XI-XI of FIG. 9.

FIG. 11 is a cross-sectional view taken along line XI-XI of FIG. 9.

The electrically operated water pump 33 includes a housing 33g, an electric motor 111 having a stator 33h and a rotor 33j that are disposed in the pump base 33c which serves as part of the housing 33g, and an impeller 112 mounted on the motor shaft 115 of the electric motor 111.

The mount 33e of the electrically operated water pump 33 is mounted by a rubber mount structure on a vertical boss 75d that is integral with the lateral boss 75b of the cylinder block 75. Similarly, the mount 33f of the electrically operated water pump 33 is mounted by a rubber mount structure on a vertical boss 85a on an upper surface of a side of the upper case 85.

More specifically, the mount 33e has a vertically extending through hole 33k defined therein. A rubber washer 141 is disposed on an upper surface of the mount 33e, and another rubber washer 141 and a metal washer 142 are disposed on a lower surface of the mount 33e. A flanged tubular collar 143 is inserted downwardly through the through hole 33k, the washer 141 on the upper surface of the mount 33e, and the rubber washer 141 and the metal washer 142 on the lower surface of the mount 33e. A bolt 108 is inserted through the collar 143 and has a distal end portion threaded into an internally threaded bolt hole 33m defined in the vertical boss 75d. The inside diameter of the through hole 33k is greater than the outside diameter of the collar 143. Therefore, a gap is defined between the surface that defines the through hole 33k and the collar 143. The mount 33e is sandwiched and elastically supported by the upper and lower rubber washers 141, and vertically movable with respect to the collar 143.

The mount 33f is also supported by a similar rubber mount structure as is the case with the mount 33e.

Since the electrically operated water pump 33 is thus mounted by the rubber mount structures, vibrations of the engine 16 are less likely to be transmitted to the electrically operated water pump 33, which is thus made highly reliable in operation. Furthermore, vibrations that are produced when the electrically operated water pump 33 is in operation are less liable to be transmitted through the crankcase 27 to the vehicle body frame 11 (see FIG. 1).

As shown in FIGS. 4, 6, 7, and 11, the supercharged engine 16 includes the supercharger 31 which is disposed rearwardly of the cylinder assembly 61 of the engine 16, for supplying supercharging air into the combustion chamber of the engine 16, the drive pulley 53 mounted on the supercharger drive shaft 51 of the engine 16, the driven pulley 54 mounted on the input shaft 52 of the supercharger 31, the drive belt 56 trained around the drive pulley 53 and the driven pulley 54, the water-cooled intercooler 32 for cooling supercharging air that is supplied from the supercharger 31, and the water pump 33 serving as a coolant pump for delivering cooling water under pressure to the intercooler 32, wherein the supercharged engine 16 further includes the belt tensioner 57 for tensioning the drive belt 56, and the water pump includes the electrically operated water pump 33 serving as an electrically operated coolant pump actuatable by the electric motor 111 and disposed on the crankcase 27 which is positioned more closely to the center of the engine across the width thereof in directions along the crankshaft of the engine than the belt tensioner 57.

With the above arrangement, the electrically operated water pump 33 is capable of supplying cooling water at a necessary rate depending on the manner in which the intercooler 32 cools intake air. Since the electrically operated water pump 33 having the electric motor 111 is disposed more closely to the center of the engine across the width thereof in directions along the crankshaft of the engine than the belt tensioner 57 for tensioning the drive belt 56 that actuates the supercharger 31, the electrically operated water pump 33 is disposed in a compact layout on the engine 16.

As shown in FIGS. 5 and 7, the belt tensioner 57 is disposed in a position overlapping the cylinder assembly 61 as viewed in the directions along the crankshaft, and the electrically operated water pump 33 is disposed on an upper portion of the crankcase 27 and between the belt tensioner 57 and the cylinder assembly 61. As the cylinder assembly 61 of the engine 16 is narrower than the crankcase 27, the electrically operated water pump 33 is disposed in a compact layout in the space 130 that is created sideways of the cylinder assembly 61 due to the difference between the widths of the crankcase 27 and the cylinder assembly 61.

As shown in FIGS. 7 and 11, inasmuch as the electrically operated water pump 33 is provided such that the motor shaft 115 of the electric motor 111 extends perpendicularly to the crankshaft 91, the electrically operated water pump 33 is disposed in a compact layout in a small space defined between the belt tensioner 57 and the cylinder assembly 61 because the motor shaft 115 extends perpendicularly to the crankshaft 91 even if the motor shaft 115 is relatively long.

As shown in FIG. 11, the vertical bosses 75d and 85a serving as coolant pump mount bosses having the vertically extending bolt holes 33m are disposed on the upper surface of the crankcase 27 and the side surface of the cylinder assembly 61, and the electrically operated water pump 33 is mounted by the rubber mount structures on the vertical bosses 75d and 85a. The vertical bosses 75d and 85a can easily be formed on the upper surface of the crankcase 27 and the side surface of the cylinder assembly 61 as the electrically operated water pump 33 is placed on the upper portion of the crankcase 27 and the side portion of the cylinder assembly 61.

As shown in FIGS. 6, 9 and 11, the lateral boss 75b, as a tensioner mount boss on which the belt tensioner 57 is mounted, projects sideways from the side surface of the cylinder assembly 61, and the vertical boss 75d is integrally combined with an upper portion of the lateral boss 75b. Therefore, the belt tensioner 57 can easily be mounted on the cylinder assembly 61, and the electrically operated water pump 33 can be disposed in a compact layout including mount boss positions for accessories including the belt tensioner 57 and the electrically operated water pump 33. In addition, since the vertical boss 75d is integrally combined with the lateral boss 75b, they have a higher level of mechanical strength than if they are separate from each other.

As shown in FIGS. 4 and 8, the sub-radiator 34 that is connected to the electrically operated water pump 33 is disposed forwardly of the cylinder assembly 61, and the first cooling water hose 95, the second cooling water hose 96, and the third cooling water hose 97 as coolant pipes that interconnect the intercooler 32 and the electrically operated water pump 33, the electrically operated water pump 33 and the sub-radiator 34, and the intercooler 32 and the sub-radiator 34, respectively, are disposed in the space 130 that is defined sideways outwardly of the cylinder assembly 61 and sideways inwardly of the drive belt 56. Consequently, the electrically operated water pump 33, the first cooling water hose 95, the second cooling water hose 96, and the third cooling water hose 97 are disposed in a compact layout on the engine 16.

As shown in FIGS. 4, 5, and 8, the cooler inlet port 32b, the pump inlet port 33a, and the radiator inlet port 34a which serve as cooling water inlet ports disposed respectively on the intercooler 32, the electrically operated water pump 33, and the sub-radiator 34, and the cooler outlet port 32a, the pump outlet port 33b, and the radiator outlet port 34b which serve as cooling water outlet ports disposed respectively on the intercooler 32, the electrically operated water pump 33, and the sub-radiator 34 extend along a plane perpendicular to the crankshaft 91. Therefore, the space occupied by the first cooling water hose 95, the second cooling water hose 96, and the third cooling water hose 97 is reduced, allowing the space 130 to be effectively utilized.

The above embodiment merely represents an aspect of the present invention, and may be modified and adapted as desired without departing from the scope of the invention.

The present invention is not only applicable to the two-wheeled motorcycle 10, but also applicable to saddle-type vehicles including those other than two-wheeled motorcycles. The saddle-type vehicles refer to vehicles in general where drivers are seated astride the vehicle body, and may include not only two-wheeled motorcycles (including powered bicycles), but also three-wheeled vehicles and four-wheeled vehicles that are classified as all-terrain vehicles (ATVs).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine including a supercharger operatively connected to a cylinder assembly of the engine, for supplying supercharging air into a combustion chamber of said engine, a drive pulley mounted on a supercharger drive shaft of said engine, a driven pulley mounted on an input shaft of said supercharger, a drive belt trained around said drive pulley and said driven pulley, a liquid-cooled intercooler for cooling supercharging air that is supplied from said supercharger, and a coolant pump for delivering a coolant under pressure to said intercooler, the supercharged engine comprising:
   a belt tensioner for tensioning said drive belt, wherein said belt tensioner is disposed in a position overlapping said cylinder assembly as viewed in a direction along the crankshaft;
   an electric motor operatively connected to said coolant pump for rotating said coolant pump, said coolant pump being positioned in close proximity to the engine in a direction along a crankshaft of the engine relative to the positioning of said belt tensioner.

2. The engine according to claim 1, wherein said electrically operated coolant pump is disposed on an upper portion of a crankcase and between said belt tensioner and said cylinder assembly.

3. The engine according to claim 1, and further including a motor shaft of said electric motor, said motor shaft being operatively connected to said coolant pump and extending perpendicularly to said crankshaft.

4. The engine according to claim 2, and further including a motor shaft of said electric motor, said motor shaft being operatively connected to said coolant pump and extending perpendicularly to said crankshaft.

5. The engine according to claim 1, and further including coolant pump mount bosses having vertically extending bolt holes, said bolt holes being disposed on an upper surface of a crankcase and a side surface of said cylinder assembly, and said electrically operated coolant pump is mounted by rubber mount structures on said coolant pump mount bosses.

6. The engine according to claim 2, and further including coolant pump mount bosses having vertically extending bolt holes, said bolt holes being disposed on an upper surface of a crankcase and a side surface of said cylinder assembly, and said electrically operated coolant pump is mounted by rubber mount structures on said coolant pump mount bosses.

7. The engine according to claim 3, and further including coolant pump mount bosses having vertically extending bolt holes, said bolt holes being disposed on an upper surface of a crankcase and a side surface of said cylinder assembly, and said electrically operated coolant pump is mounted by rubber mount structures on said coolant pump mount bosses.

8. The engine according to claim 5, and further including a tensioner mount boss for mounting said belt tensioner, said tensioner mount boss projecting away from the side surface of said cylinder assembly, and said coolant pump mount bosses are disposed on an upper portion of said tensioner mount boss.

9. The engine according to claim 1, and further including a sub-radiator connected to said electrically operated coolant pump, said sub-radiator being disposed in front of said cylinder assembly with coolant pipes for interconnecting said intercooler and said electrically operated coolant pump.

10. The engine according to claim 2, and further including a sub-radiator connected to said electrically operated coolant pump, said sub-radiator being disposed in front of said cylinder assembly with coolant pipes for interconnecting said intercooler and said electrically operated coolant pump.

11. The engine according to claim 3, and further including a sub-radiator connected to said electrically operated coolant pump, said sub-radiator being disposed in front of said cylinder assembly with coolant pipes for interconnecting said intercooler and said electrically operated coolant pump.

12. The engine according to claim 9, and further including coolant inlet ports disposed, respectively, on said intercooler, said electrically operated coolant pump, and said sub-radiator, and coolant outlet ports disposed, respectively, on said intercooler, said electrically operated coolant pump, and said sub-radiator extend along a plane perpendicular to said crankshaft.

13. An engine comprising:
a supercharger operatively connected to a cylinder assembly of the engine, for supplying supercharging air into a combustion chamber of said engine;
a drive pulley mounted on a supercharger drive shaft;
a driven pulley mounted on an input shaft of said supercharger;
a drive belt trained around said drive pulley and said driven pulley, said driven pulley having a belt tensioner for tensioning said drive belt, wherein said belt tensioner is disposed in a position overlapping said cylinder assembly as viewed in a direction along the crankshaft;
a liquid-cooled intercooler for cooling supercharging air supplied from said supercharger;
a coolant pump for delivering a coolant under pressure to said intercooler;
an electric motor operatively connected to said coolant pump for rotating said coolant pump, said coolant pump being positioned in close proximity to the engine in a direction along a crankshaft of the engine relative to the positioning of said belt tensioner.

14. The engine according ID claim 13, wherein said electrically operated coolant pump is disposed on an upper portion of a crankcase and between said belt tensioner and said cylinder assembly.

15. The engine according to claim 13, and further including a motor shaft of said electric motor, said motor shaft being operatively connected to said coolant pump and extending perpendicularly to said crankshaft.

16. The engine according to claim 13, and further including coolant pump mount bosses having vertically extending bolt holes, said bolt holes being disposed on an upper surface of a crankcase and a side surface of said cylinder assembly, and said electrically operated coolant pump is mounted by rubber mount structures on said coolant pump mount bosses.

17. The engine according to claim 14, and further including coolant pump mount bosses having vertically extending bolt holes, said bolt holes being disposed on an upper surface of a crankcase and a side surface of said cylinder assembly, and said electrically operated coolant pump is mounted by rubber mount structures on said coolant pump mount bosses.

18. The engine according to claim 16, and further including a tensioner mount boss for mounting said belt tensioner, said tensioner mount boss projecting away from the side surface of said cylinder assembly, and said coolant pump mount bosses are disposed on an upper portion of said tensioner mount boss.

19. The engine according to claim 13, and further including a sub-radiator connected to said electrically operated coolant pump, said sub-radiator being disposed in front of said cylinder assembly with coolant pipes for interconnecting said intercooler and said electrically operated coolant pump.

20. The engine according to claim 19, and further including coolant inlet ports disposed, respectively, on said intercooler, said electrically operated coolant pump, and said sub-radiator, and coolant outlet ports disposed respectively on said intercooler, said electrically operated coolant pump, and said sub-radiator extend along a plane perpendicular to said crankshaft.

* * * * *